(12) United States Patent
Hamman et al.

(10) Patent No.: US 10,009,180 B2
(45) Date of Patent: Jun. 26, 2018

(54) SYSTEM AND METHOD FOR GENERATING AUDITABLE SECURE SEEDS FROM REAL-WORLD DATA

(71) Applicant: SCA Promotions, Inc., Dallas, TX (US)

(72) Inventors: Robert David Hamman, Dallas, TX (US); William Carey Kennedy, III, Dallas, TX (US); William John Rump, McKinney, TX (US); Kenneth Earl Irwin, Dawsonville, GA (US)

(73) Assignee: SCA Promotions, Inc., Dallas, TX (US)

( * ) Notice: Subject to any disclaimer, the term of this patent is extended or adjusted under 35 U.S.C. 154(b) by 230 days.

(21) Appl. No.: 15/152,055

(22) Filed: May 11, 2016

(65) Prior Publication Data
US 2016/0337129 A1  Nov. 17, 2016

Related U.S. Application Data

(60) Provisional application No. 62/179,672, filed on May 14, 2015.

(51) Int. Cl.
*H04L 9/32* (2006.01)
*G06F 21/64* (2013.01)

(52) U.S. Cl.
CPC .......... *H04L 9/3247* (2013.01); *G06F 21/645* (2013.01); *H04L 9/3226* (2013.01)

(58) Field of Classification Search
CPC ... H04L 9/3247; H04L 9/3226; G06F 21/645; G06F 21/00; G07F 17/3241; A63F 13/70; A63F 13/71
See application file for complete search history.

(56) References Cited

U.S. PATENT DOCUMENTS

| | | | |
|---|---|---|---|
| 6,030,288 A * | 2/2000 | Davis | G06Q 40/025 463/29 |
| 6,099,408 A | 8/2000 | Schneier | |
| 6,264,557 B1 | 7/2001 | Schneier | |
| 6,477,251 B1 | 11/2002 | Szrek | |

(Continued)

OTHER PUBLICATIONS

"Communication Theory of Secrecy Systems" in the Bell Labs Technical Journal 28 (4): 656-715.

*Primary Examiner* — Matthew Smithers
(74) *Attorney, Agent, or Firm* — Baker Botts L.L.P.

(57) ABSTRACT

An interface receives a first digital signature of real-world data. A memory stores the first digital signature as seed data. The interface receives a second digital signature of real-world data. The memory stores the second digital signature as seed data. A processor generates first draw seed based, at least in part, on the seed data. The processor generates a first draw result based upon the first draw seed and a drawing algorithm. The interface receives a second draw result from a remote entity, the second draw result based, at least in part, on the first digital signature and the second digital signature. The processor determines whether the first draw result and the second draw result are in agreement. Upon a determination that the first draw result and the second draw result are in agreement, the interface communicates at least one of the first draw result and the second draw result.

20 Claims, 5 Drawing Sheets

(56) References Cited

U.S. PATENT DOCUMENTS

| | | | | |
|---|---|---|---|---|
| 6,934,846 B2* | 8/2005 | Szrek | ............ | G06F 7/58 |
| | | | | 380/251 |
| 7,155,014 B1 | 12/2006 | Hamman | | |
| 7,892,087 B1 | 2/2011 | Hamman | | |
| 8,016,662 B1 | 9/2011 | Hamman | | |
| 9,155,959 B2* | 10/2015 | Riera Jorba | ............ | A63F 9/24 |
| 2004/0102242 A1* | 5/2004 | Poelmann | ............ | G06F 7/582 |
| | | | | 463/22 |
| 2004/0166942 A1* | 8/2004 | Muir | ............ | G06Q 20/346 |
| | | | | 463/43 |
| 2007/0213125 A1* | 9/2007 | Szrek | ............ | G07F 17/32 |
| | | | | 463/29 |
| 2009/0150290 A1* | 6/2009 | Szrek | ............ | G06Q 20/209 |
| | | | | 705/50 |
| 2010/0121896 A1* | 5/2010 | Oram | ............ | G06F 7/582 |
| | | | | 708/250 |
| 2010/0240440 A1* | 9/2010 | Szrek | ............ | G07F 17/3241 |
| | | | | 463/22 |
| 2017/0178449 A1* | 6/2017 | Arnone | ............ | G07F 17/3241 |

* cited by examiner

SYSTEM AND METHOD FOR GENERATING AUDITABLE SECURE SEEDS FROM REAL-WORLD DATA

RELATED APPLICATIONS

This application claims the benefit of priority of U.S. Provisional Patent Application No. 62/179,672 filed on May 14, 2015.

TECHNICAL FIELD

This invention relates generally to random number generators and real-time data seed generation, and more particularly to providing auditable secure seeds to determine gaming outcomes.

BACKGROUND

Gaming applications often use Random Number Generators and/or real-world data to produce draw results. For example, the draw results may identify outcomes in gaming applications such as lotto quick picks, slot machines, Keno, Internet gaming sites, and national draw game outcomes. Random Number Generators and/or real-world data may be used to produce a seed or series of seeds that are input into an algorithm to produce an output (i.e., draw result). The draw result is unpredictable so long as the input seed(s) remain unknown. Thus, for some gaming systems to remain secure, it is essential that the input seed(s) remain unknown and secure. However, conventional systems lack adequate security in maintaining the integrity of input seeds.

The logistical challenges of selecting draw game seed(s) that are random or at the very least previously unpredictable have proven daunting with numerous security breaches having been observed over the years. For example, the Internet site www.PlanetPoker.com publicly displayed its shuffling algorithm in an attempt to advertise how fair its game was to any interested players. However, in the publicly displayed source code, the call to its Random Number Generator ("RNG") was included to produce a random deck before each deck was generated. This implementation, built with Delphi 4, seeds the RNG with the number of milliseconds since midnight according to the system clock of the host server. This means players outside of the organization could easily predict the output of the RNG. By synchronizing a player's personal computer clock with the clock on PlanetPoker.com, an outside computer program could calculate the exact shuffle. Thus, the outside player would know all the cards that have yet to appear, everyone's hand, and who will win. This fraud, while unintended by the operator, still allowed some outside players to gain an unfair advantage over others.

In addition to the seed(s) selection process, there have been security problems associated with the insertion of different seeds into an RNG, or for that matter, bypassing the RNG output altogether to produce a false drawing outcome. One example was with the IGT slot machine "Game King." In 2009, a seven year old bug in the Game King slot machine was exploited that effectively allowed a user to bypass the machine's RNG output and replay winning hands. This bug exploitation resulted in over $1,000,000 in false winnings being awarded. Another example was in 1995 when a Nevada Gaming Control Board's (GCB's) staffer covertly reprogrammed the Erasable Programmable Read Only Memory (EPROM) in the prototype slot machines that he was auditing to include a backdoor Easter Egg that would trigger a jackpot upon a particular sequence of button presses. When these EPROMs were duplicated and put into production, the staffer was able to trigger the jackpot Easter Egg at will and collect hundreds of thousands of dollars in illicit winnings. Even mechanical RNG systems have been subjected to fraudulent manipulation. For example, in 1980, the Pennsylvania Lottery daily number game ping pong ball drawing was rigged by subtlety increasing the weight of the drawing ping pong balls except for those numbered "4" and "6" with the actual compromised drawing result of "666."

Some gains in RNG seed security have been realized by employing special purpose hardware RNG seed generators. For enhanced security, these special purpose hardware RNG seed generators also digitally sign the generated random number seeds that are created, thereby creating an audit path proving the authenticity of the RNG seed(s) so long as the special purpose hardware remains uncompromised. A technique for further enhancing the security by maintaining an RNG seed generation audit trail is taught in U.S. Pat. No. 7,892,087 (Hamman et. al.). As disclosed in Hamman et. al., employing a game server to generate random numbers or seeds separate from the client server (i.e., the server conducting the actual game preferably operated by a different entity) where the generated random numbers or seeds are stored in a digitally signed file that enables another level of forensic auditability, which further enhancing the integrity of the RNG drawing. Additionally, U.S. Pat. Nos. 6,477,251 and 6,934,846 (Szrek et. al.) teach using multiple processors in tandem to generate an auditable pseudorandom outcome. The '251 Patent discloses utilizing multiple processors with associated individual logs to generate a random outcome, while the '846 Patent discloses adding digital signatures as a faun of authentication from a separate server. However, neither of the Szrek et. al. nor the Hamman et. al. patents address the vexing problem of malicious software potentially inserted by an insider programmer (e.g., the Nevada GCB staffer, fraudulent "Hot Lotto" $16.5 million drawing in 2010 and alleged fraudulent RNG drawings in Colorado, Oklahoma, Iowa, Kansas, and Wisconsin). Additionally, neither Szrek et. al. nor the Hamman et. al. discloses creating an audit trail to detect a malicious software drawing result in real-time.

U.S. Pat. Nos. 6,099,408 and 6,264,557 (Schneier et. al.) disclose combining random number selections from multiple entities where at least one entity commits to a random number selection by sending either a cryptographic hash or encrypted ciphertext of the random number selected before receiving the random number selection of the other entity. Schneier et. al. teaches combining the at least two random number selections in a manner that is ". . . unique to the particular game selected." ('557 patent, column 9, lines 45 through 48). Not only does this game unique combining methodology not ensure true randomness in the final composite drawing, it also leaves the system potentially vulnerable to one entity forcing an illicit drawing outcome with some gaming formats unless extreme care was exercised for each game unique combiner algorithm.

Finally, U.S. Pat. No. 8,016,662 (Hamman et. al.) teaches using publicly verifiable outcomes of non-deterministic events as seeds for random number drawings. While the usage of publicly-verifiable outcomes does tend to mitigate insider fraud, it usually has the disadvantages of: human (i.e., error prone) input, time synchronization with outside events, and possibly open network access to the RNG sever(s) thereby potentially exposing the servers to potential external hacking.

Therefore, it is highly desirable to develop methodologies correct the deficiencies of the previously discussed disclosures to ensure the integrity and security of RNG seed or number generation, particularly against malicious software.

SUMMARY OF EXAMPLE EMBODIMENTS

According to embodiments of the present disclosure, disadvantages and problems associated with gaming devices reliant on random number generation may be reduced or eliminated. In accordance with a particular embodiment of the present disclosure, a processor generates a first seed, wherein the first seed is a random number. The processor generates, a digital signature of the first seed. An interface communicates a digital signature of the first seed to a first remote entity. The interface receives a digital signature of a second seed. After communicating the digital signature of the first seed to the first remote entity, the interface receives the second seed from the first remote entity. After receiving the digital signature of the second seed, the interface communicates the first seed to the first remote entity. The processor determines, using the digital signature of the second seed and the second seed, whether the second seed is valid. Upon a determination that the second seed is valid, the processor combines the first seed and the second seed to form a drawing seed. The processor generates a first draw result using the drawing seed and a drawing algorithm. The interface receives a second draw result from the first remote entity. The processor compares the first draw result and the second draw result. The interface communicates the draw results upon a determination that the first draw result and the second draw result are in agreement.

In accordance with another embodiment of the present disclosure, a method includes: receiving, through an interface, a first digital signature of real-world data; storing, using a memory, the first digital signature as seed data; receiving, through the interface, a second digital signature of real-world data; storing, using the memory, the second digital signature as seed data; generating, using a processor, a first draw seed based, at least in part, on the seed data; generating, using the processor, a first draw result based upon the first draw seed and a drawing algorithm; receiving, through the interface, a second draw result from a remote entity, the second draw result based, at least in part, on the first digital signature and the second digital signature; determining, using the processor, whether the first draw result and the second draw result are in agreement; and upon a determination that the first draw result and the second draw result are in agreement, communicating, through the interface, at least one of the first draw result and the second draw result.

Certain embodiments of the present disclosure may provide one or more technical advantages. A technical advantage of one embodiment includes increasing the security of data and encrypted data. As another example, a technical advantage of one embodiment includes increasing the security of gaming devices performing random number generation. As yet another example, a technical advantage includes increasing user's trust in the fairness of gaming devices reliant on random number drawings. As a further example, a technical advantage of one embodiment includes improving the efficiency of publicizing draw results. As yet a further example, a technical advantage of one embodiment includes providing a forensic audit trail and determining malicious activity of draw results before the results are made public, which increases efficiency.

Other technical advantages of the present disclosure will be readily apparent to one skilled in the art from the following figures, descriptions, and claims. Moreover, while examples of specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-5, like numerals being used for like and corresponding parts of the various drawings.

Random Number Generators (RNGs) or Pseudo Random Number Generators (PRNGs) have been used for gaming applications for decades. For example, RNGs have been utilized for lotto quick picks, slot machines, Keno, Internet gaming sites, and national draw game outcomes (e.g., Hot Lotto). Almost all gaming RNG algorithms accept a seed or series of seeds as an input and produce an output string (i.e., draw results) that is algorithmically related to the input seed(s), but nevertheless unpredictable so long as the input seed(s) remain unknown. The logistical challenges of selecting draw game seed(s) that are random or at the very least previously unpredictable have proven daunting with numerous security breaches having been observed over the years. In conventional systems, RNG seeds may be known by one or more entities and may not be auditable in real time.

To remain secure, it is essential for gaming systems that utilize these algorithms, that the input seed(s) are unknown while wagers are being accepted. Then after wagers are no longer being accepted, the gaming system should produce input seed(s) for processing that were previously unpredictable. Ideally, this secure gaming system should also produce an audit trail of the seed(s) and output string thereby allowing for forensic analysis to ensure that drawings are legitimate.

This disclosure recognizes the advantages of providing a seed that is unknown while wagers are being accepted. This disclosure recognizes the advantages of two or more entities exchanging seeds unknown by the other entities. This disclosure further recognizes the advantages of providing an automatic, real-time audit using seeds. These advantages provide for more efficient and secure seed generation between separate entities for use, for example, in gaming systems.

Ensuring the security of a drawing across multiple jurisdictions or entities where there is no trusted party requires all participating entities to release synchronized seed data. With separate entities committing seed data from locked down and random sources, a secure drawing can occur that is completely auditable as well as protected from alteration of the intended draw results with drawing validation possible in a real-time fashion.

Figure 1:
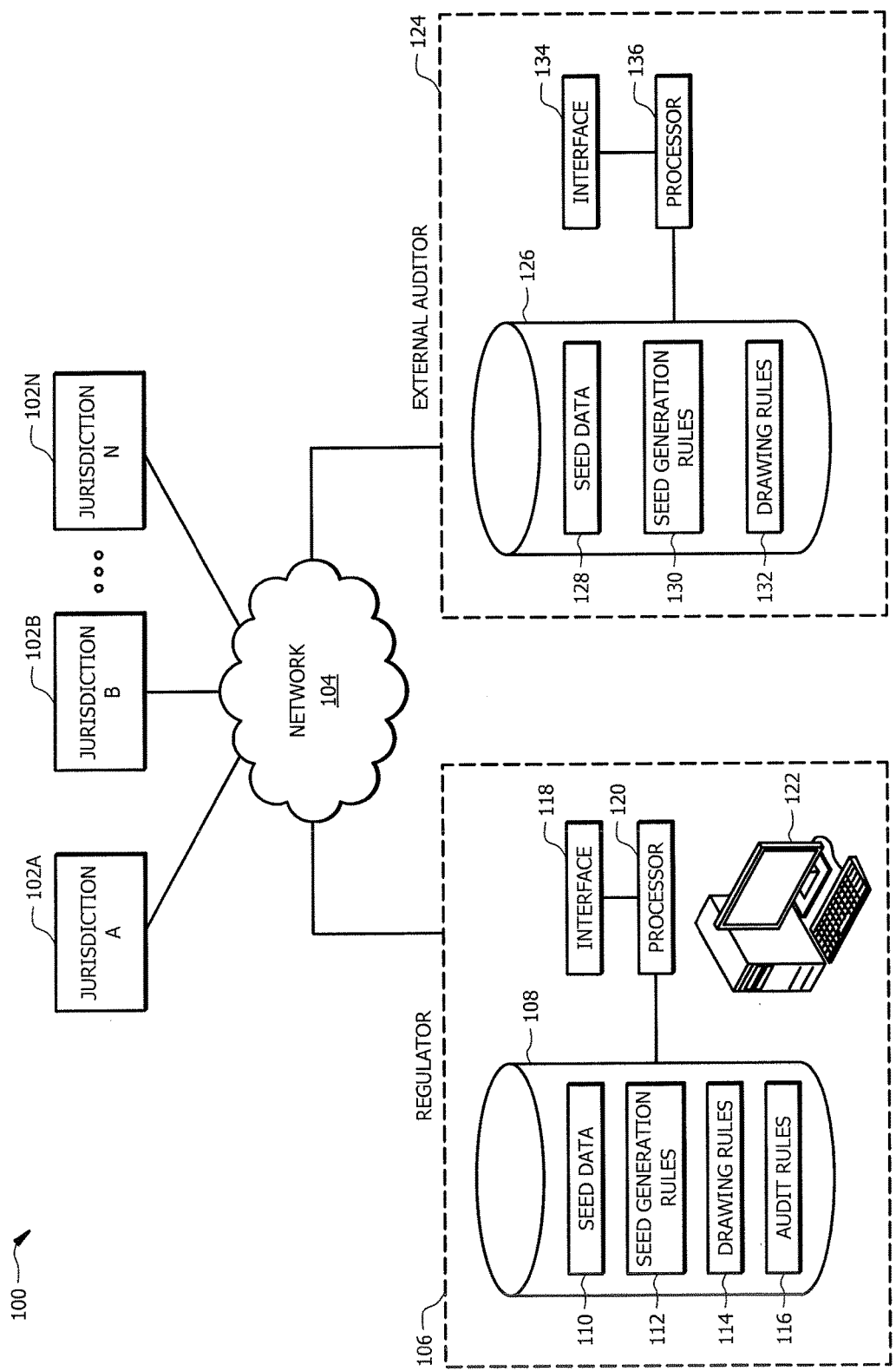
FIG. 1 illustrates a system for generating draw results with auditable secure seeds.

FIG. 1 illustrates a system for generating draw results with auditable secure seeds. More specifically, system 100 includes jurisdictions 102, regulator 106, and external auditor 124 that may be communicatively coupled by network 104. Generally, jurisdictions 102 provide seeds to other jurisdictions 102, regulator 106, and/or external auditor 124 via network 104. Generally, jurisdictions 102 (and/or any other suitable component of system 100) produce seeds with a RNG and/or a digital signature of real-world data. In an embodiment, the seeds are used to generate draw results to determine a winner of a game.

System 100 may include jurisdictions 102a-102n, where n represents any suitable number. Jurisdictions 102 may be operated by any person or entity that produce seeds, is interested in the outcome of a draw result, and/or oversees a lottery or other type of drawing game. For example, a jurisdiction 102 may be a state lottery, such as the Texas lottery. In an embodiment, jurisdiction 102 may, in addition, be regulator 106 and/or external auditor 124 that may facilitate a game drawing and/or ensure the security and fairness of a game drawing. Jurisdictions 102 are described in more detail in relation to FIG. 2.

Network 104 facilitates communication between jurisdictions 102, regulator 106, and/or external auditor 124. This disclosure contemplates any suitable network 104 operable to facilitate communication between the components of system 100. Network 104 may include any interconnecting system capable of transmitting audio, video, signals, data, messages, or any combination of the preceding. Network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Further, network 104 may describe a direct-wired connection between any of the components of system 100. This disclosure contemplates end networks having one or more of the described properties of network 104.

System 100 may also comprise one or more regulators 106. Generally, regulator 106 is an entity that authorizes and conducts one or more drawings. For example, regulator 106 may be a trusted third party that facilitates a drawing. As another example, an entity may have the dual role of regulator 106 and a jurisdiction 102. Generally, regulator 106 receives seed(s) from one or more jurisdictions 102 and applies those seeds to a drawing algorithm to determine a draw result. In an embodiment, regulator 106 may generate its own seed without receiving information from a jurisdiction 102. Regulator 106 may publicize drawing results and/or communicate drawing results to one or more jurisdictions 102 and/or one or more external auditors 124. Regulator 106 may also flag and/or audit drawing results.

As illustrated, regulator 106 comprises memory 108, interface 118, processor 120, and computer 122. Interface 118 represents any suitable device operable to receive information from network 104, transmit information through network 104, perform suitable processing of the information, communicate to other devices, or any combination of the preceding. For example, interface 118 receives seeds from one or more jurisdictions 102 and/or external auditor 124. As another example, interface 118 communicates drawing results to one or more jurisdictions 102, external auditor 124, and/or any other suitable person or entity. In another example, interface 118 communicates seeds to one or more components of system 100. Interface 118 represents any port or connection, real or virtual, including any suitable hardware and/or software, including protocol conversion and data processing capabilities, to communicate through a LAN, WAN, or other communication systems that allows regulator 106 to exchange information with network 104, one or more jurisdictions 102, external auditor 124, and/or any other suitable component of system 100.

Processor 120 controls the operation and administration of regulator 106 by processing information received from interface 118 and memory 108. Processor 120 communicatively couples to interface 118 and memory 108. Processor 120 includes any hardware and/or software that operates to control and process information. For example, processor 120 may be a programmable logic device, a microcontroller, a microprocessor, any suitable processing device, or any suitable combination of the preceding.

As illustrated, system 100 may also include computer 122. Computer 122 may be any device that interacts with system 100. Computer 122 may represent one or more computers. Computer 122 may be located in regulator 106, external auditor 124, one or more jurisdictions 102, and/or any other suitable location in system 100. In an embodiment, computer 122 may interact with regulator 106, external auditor 124, or any other suitable component of system 100 via network 104 to request, modify, or receive data. For example, computer 122 may facilitate sending or requesting seeds. In another example, computer 122 may create and/or update rules in memory 108, rules in memory 126, or any other rules in system 100. Computer 122 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100, or any combination of the preceding. Computer 122 may also include a user interface, such as a display, a touchscreen, a microphone, keypad, or other appropriate terminal equipment usable by a user.

Memory 108 may be a database that stores, either permanently or temporarily, received data, seed data 110, seed generation rules 112, drawing rules 114, audit rules 116, any other suitable data, or any combination of the preceding. Memory 108 includes any one or a combination of volatile or non-volatile local or remote devices suitable for storing information. For example, memory 108 may include random access memory (RAM), read-only memory (ROM), magnetic storage devices, optical storage devices, or any other suitable information storage device or combination of these devices. Memory 108 may include any suitable information for use in the operation of regulator 106. Additionally, memory 108 may be a component external to regulator 106. Memory 108 may be located in regulator 106 or any other location suitable for memory 108 to communicate with regulator 106.

Memory 108 may include seed data 110, seed generation rules 112, drawing rules 114, and/or audit rules 116. Generally, seed data 110 comprises data that is used to generate seeds for input in a drawing algorithm (e.g., an algorithm described by drawings rules 114). For example, one or more jurisdictions 102 may communicate data to regulator 106 via network 104. Additionally or alternatively, regulator 106 and/or any other component of system 100 may generate data to store as seed data 110. In an embodiment, seed data 110 may be digital signatures of real world data received from one or more jurisdictions 102 and/or any other component of system 100. In another embodiment, seed data 110 may comprise random numbers generated by one or more jurisdictions 102 and/or any other suitable component of system 100.

Seed generation rules 112 generally refer to logic, rules, algorithms, code, tables, and/or other suitable instructions embodied in a computer-readable storage medium for performing the described functions and operations of regulator 106. Generally, seed generation rules 112 facilitate transforming seed data 110 into one or more seeds for input into a drawing algorithm. For example, seed generation rules 112 may use a cryptographic hash, like Secure Hash Algorithm (SHA), to form a seed using seed data 110. As another example, rules 112 may use an exclusive-OR combination to form seeds from multiple sources. In general, the generated seed is communicated to one or more drawing algorithms to calculate a draw result. In an embodiment, processor 120 applies seed generation rules 112 to seed data 110 to generate a seed to input into a drawing algorithm.

Drawing rules 114 generally refer to logic, rules, algorithms, code, tables, and/or other suitable instructions embodied in a computer-readable storage medium for performing the described functions and operations of regulator 106. Generally, processor 120 applies drawing rules 114 to the generated seed to determine a draw result. Drawing rules 114 may describe a drawing algorithm used to determine a draw result. The drawing algorithm receives the seed generated using seed generation rules 112 and performs a game unique (i.e., different algorithm compatible with the game type of the drawing) transformation to produce the appropriate draw game results (e.g., three decimal digits for a "Pick 3" drawing, four decimal digits for a "Pick 4" drawing, decimal digits "0-37" for a roulette game, 52 cards in a Poker deck shuffle, etc.). While the drawing algorithm design may vary, it is typically structured where the seed input is first applied to a Linear Congruential Generator (LCG) or Mersenne Twister that provides a deterministic series of number. For example the deterministic series may be a sequence of pseudorandom numbers over a defined range. This resulting deterministic series of number selections output from the LCG or Mersenne Twister are then typically input into to a Fisher-Yates type shuffle algorithm to transform the deterministic number selection series into the appropriate draw game results. For example, the Fisher-Yates type shuffle may take a relatively large sequence of numbers and randomly transform the sequence into an appropriate amount of numbers for a particular drawing game (e.g., three numbers for a "Pick 3" drawing.).

Audit rules 116 generally refer to logic, rules, algorithms, code, tables, and/or other suitable instructions embodied in a computer-readable storage medium for performing the described functions and operations of regulator 106. Generally, audit rules 116 facilitate conducting an audit when there is a discrepancy in a draw result. In an embodiment, two or more separate components of system 100 may produce draw results using identical seed data 110, seed generation rules 112, and/or drawing rules 114. For example, one or more regulators 106, one or more external auditors 124, one or more jurisdictions 102, or any combination of the preceding may receive identical seeds that are used to produce draw results as discussed previously. Audit rules 116 may be used to confirm that each component's draw results are in agreement (e.g., the same). For example, audit rules 116 may determine whether the draw results are identical (e.g., by comparing the numbers, subtracting the numbers, etc.). If one or more components do not produce the same draw result, audit rules 116 facilitate determining the source of the inconsistency. These embodiments describe a secure drawing result. Additionally, by automatically determining that draw results are in agreement (e.g., indicating the same outcome) before the drawing results are publicized, audit rules 116 allow an audit to be conducted in real time, which increases efficiency and integrity of the drawing.

System 100 may further comprise external auditor 124. In the illustrated embodiment, external auditor 124 comprises interface 134, processor 136, and memory 126. Interface 134 represents any suitable device operable to receive information from network 104, transmit information through network 104, perform suitable processing of the information, communicate to other devices, or any combination of the preceding. For example, interface 134 receives seeds from one or more jurisdictions 102 or regulator 106. As another example, interface 134 communicates drawing results to one or more jurisdictions 102, regulator 106, and/or any other suitable person or entity. In another example, interface 134 communicates seeds to one or more components of system 100. Interface 134 represents any port or connection, real or virtual, including any suitable hardware and/or software, including protocol conversion and data processing capabilities, to communicate through a LAN, WAN, or other communication systems that allows external auditor 124 to exchange information with network 104, one or more jurisdictions 102, regulator 106, and/or any other suitable component of system 100.

Processor 136 controls the operation and administration of external auditor 124 by processing information received from interface 134 and memory 126. Processor 136 communicatively couples to interface 134 and memory 126. Processor 136 includes any hardware and/or software that operate to control and process information. For example, processor 136 may be a programmable logic device, a microcontroller, a microprocessor, any suitable processing device, or any suitable combination of the preceding.

In an embodiment, external auditor 124 comprises memory 126. Memory 126, while not necessarily identical, comprises the same characteristics as memory 108. Likewise, seed data 128, seed generation rules 130, and drawing rules 132, while not necessarily identical, comprise the same characteristics as seed data 110, seed generation rules 112, and drawing rules 114, respectively.

Generally, external auditor 124 is a third party that ensures valid draw results. In general, external auditor 124 receives seed data from one or more jurisdictions 102, regulator 106, and/or any other component of system 100 to store as seed data 128. In an embodiment, seed data 128 is identical to seed data 110. In this embodiment, external auditor 124 and regulator 106 may use identical seed generation rules 114/130 and drawing rules 116/132 to produce a draw result. In this embodiment, the draw result will be identical absent an error, caused maliciously or otherwise. Thus, external auditor 124 may verify draw results of regulator 106. This has the technical advantage of making system 100 more accurate and secure.

In one exemplary embodiment of operation, system 100 may produce draw results. In this embodiment, regulator 106 and external auditor 124 receive data from jurisdiction 102. Regulator 106 and external auditor 124 apply seed generation rules 112/130 to generate seeds. Next, regulator 106 and external auditor 124 apply drawing rules to produce a first drawing result and a second drawing result. Regulator 106 and/or external auditor 124 compare the first and second drawing result to determine if the draw is valid. If the draw is valid, regulator 106 and/or external auditor 124 communicates the drawing result to jurisdiction 102 or any other suitable person or entity.

A component of system 100 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

While FIG. 1 illustrates components of system 100 operating within a gaming environment, system 100 may operate in any environment to encrypt, secure, and/or audit data to prevent an entity's malicious tampering with the data during a committed blind exchange. Furthermore, while FIG. 1 illustrates regulator 106 as separate from jurisdictions 102, regulator 106 may be part of a jurisdiction 102. Furthermore, while system 100 illustrates an external auditor 124, system 100 may operate without external auditor 102.

Figure 2:
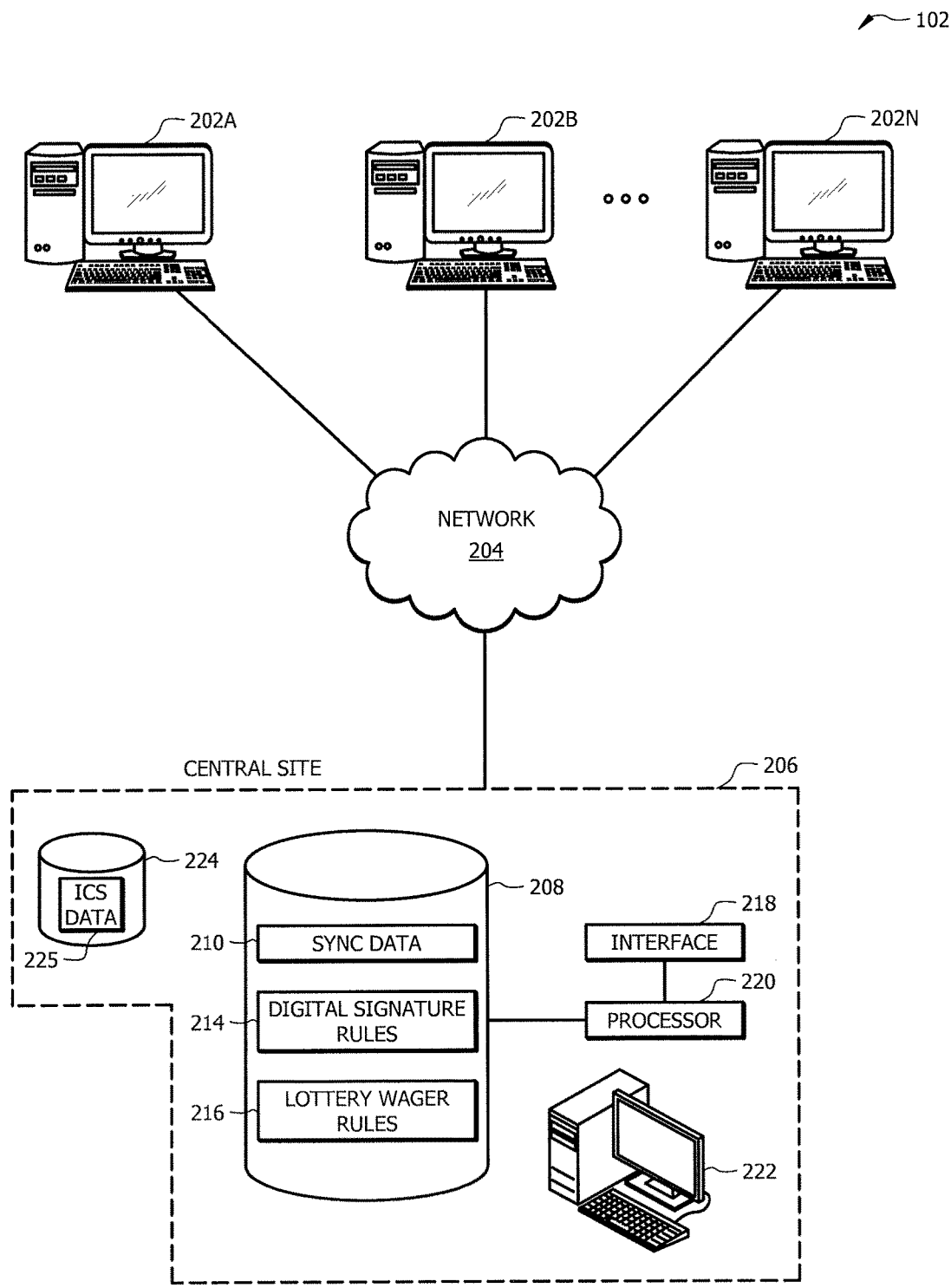
FIG. 2 illustrates another embodiment of a jurisdiction.

FIG. 2 further illustrates a jurisdiction 102 as described in FIG. 1. In the illustrated embodiment, jurisdiction 102 comprises field terminals 202 and central site 206 communicatively coupled by network 204. Generally, jurisdiction 102 receives wagers information, stores wager information, and communications data to other suitable components of system 100.

In the illustrated embodiment, jurisdiction 102 comprises field terminals 202a-202n, where n represents any suitable number. Generally, field terminals 202 accept wagers from customers and pass the wagers to central site 206 for processing. Field terminals 202 may comprise any known field terminal known in the art. For example, field terminals 202 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 200. Field terminals 202 may also include a user interface, such as a display, a touchscreen, a microphone, keypad, or other appropriate terminal equipment usable by a user. Field terminals 202 may be located within central site 206, remote to central site 206, or any other suitable location. In an embodiment, central site 206 is located within one or more field terminals 202.

Jurisdiction 102 may comprise network 204. Generally, network 204 facilitates communication between field terminals 202 and central site 206. Network 204 may be the same or different than network 104. This disclosure contemplates any suitable network 204 operable to facilitate communication between the components of jurisdiction 102. Network 204 may include any interconnecting system capable of transmitting audio, video, signals, data, messages, or any combination of the preceding. Network 204 may include all or a PSTN, LAN, MAN, WAN, a local, regional, or global communication or computer network, such as the Internet, a wireline or wireless network, an enterprise intranet, or any other suitable communication link, including combinations thereof, operable to facilitate communication between the components of jurisdiction 102. Further, network 204 may describe a direct-wired connection between any of the components of jurisdiction 102. For example, one or more field terminals 202 may be directly connected to computer 222, interface 218, or any other suitable component of jurisdiction 102. As a further example, central site 206 may be a component of field terminal 202 and thus directly connected. This disclosure contemplates end networks having one or more of the described properties of network 204.

Jurisdiction 102 may further comprise one or more central sites 206. In the illustrated embodiment, central site 206 comprises computer 222, interface 218, processor 220, memory 208, and memory 224. Generally, central site 206 receives wager data from field terminals 202, assigns serial numbers to the wager data, time tags the wager data, appends a retailer identification to the wager data, and stores the wager data as sync data 210 and/or ICS data 225 in memory 208 and memory 224, respectively. As discussed in more detail below, central site 206 may further transform sync data 210 (identical information as ICS data 225) and/or ICS data 225 and communicate the data to regulator 106, external auditor 124, and/or any other suitable components of system 100 and/or system 200. In the illustrated embodiment, central site 206 comprises interface 218, processor 220, memory 208, ICS data 225, and computer 222.

Interface 218 represents any suitable device operable to receive information from network 204, transmit information through network 204, perform suitable processing of the information, communicate to other devices, or any combination of the preceding. For example, interface 218 receives wager information from field terminals 202. As another example, interface 118 communicates data to regulator 106, external auditor 124, and/or any other suitable person or entity. Interface 218 represents any port or connection, real or virtual, including any suitable hardware and/or software, including protocol conversion and data processing capabilities, to communicate through a LAN, WAN, or other communication systems that allows central site 206 to exchange information with network 204, regulator 106, external auditor 124, one or more field terminals 202, and/or any other suitable component of system 100 and/or system 200.

Processor 220 controls the operation and administration of central site 206 by processing information received from interface 218, memory 208, and/or memory 224. Processor 220 communicatively couples to interface 218, memory 208, and/or memory 224. Processor 220 may include one processor 220 or a plurality of processors 220 (e.g., one processor communicatively coupled to memory 208 and another processor communicatively couples to memory 224). Processor 220 includes any hardware and/or software that operate to control and process infotmation. For example, processor 220 may be a programmable logic device, a microcontroller, a microprocessor, any suitable processing device, or any suitable combination of the preceding.

Memory 208 may be a database that stores, either permanently or temporarily, sync data 210, digital signature rules 214, lottery wager rules 216, any other suitable data, or any combination of the preceding. Memory 208 includes any one or a combination of volatile or non-volatile local or remote devices suitable for storing information. For example, memory 208 may include RAM, ROM, magnetic storage devices, optical storage devices, or any other suitable information storage device or combination of these devices. Memory 208 may include any suitable information for use in the operation of central site 206. Additionally, memory 208 may be a component external to central site 206. Memory 208 may be located in central site 206 or any other location suitable for memory 208 to communicate with central site 206.

Memory 208 may comprise lottery wager rules 216. Lottery wager rules 216 generally refer to logic, rules, algorithms, code, tables, and/or other suitable instructions embodied in a computer-readable storage medium for performing the described functions and operations of central site 206. Central site 206 may receive wager data from one or more field terminals 202 at interface 218 via network 204. For examples, when a customer utilizes field terminal 202 to place a wager, field terminal 202 may communicate the wager information to central site 206. Processor 220 may then apply lottery wager rules 216 to the received data before storing the data as sync data 210 and/or ICS data 225. As discussed, processor 220, using lottery wager rules 216, may assign a serial number to the wager data, time tag the wager data, append a retailer identification to the wager data, and/or transform the received wager data in any suitable manner before storing the data. In an embodiment, field terminals 202 or any other suitable component of system 200 may transform the wager data using, for example, lottery wager rules 216 prior to storing the data.

Jurisdiction 102 may also comprise memory 224. While memory 224 may be separate from memory 208, memory 224 generally has the same characteristics as memory 224. In an embodiment, memory 224 is physically housed remote from memory 208 in a secure location. Memory 224 may comprise Internal Control System ("ICS") data 225. ICS data 225 is generally identical to sync data 210 (e.g., wager data received from field terminal 202). ICS data 225 may be a collection of field bet data in a Write Once Read Many ("WORM") file. In an embodiment, memory 224 may receive ICS data 225 through the same procedure described above in relation to sync data 210. Recording identical information in two separate, secure locations is for both redundancy and security purposes. This increases the security of jurisdiction 102.

Digital signature rules 214 generally refer to logic, rules, algorithms, code, tables, and/or other suitable instructions embodied in a computer-readable storage medium for performing the described functions and operations of central site 206. Generally, field terminals 202 communicate wager data to central site 206 at or near real time. As discussed, the wager data may be transformed and stored as sync data 210 and/or ICS data 225. At some time before the official drawing is announced (e.g., an hour or any other suitable time) wagers are no longer accepted for the drawing. At this point ICS data 225 and sync data 210 may be fixed. Digital signature rules 214 are applied, for example by processor 220, to ICS data 225 and the sync data 210 to create a digital signature. For example, processor 220 may apply digital signature rules 214 to calculate a digital signature using a digital hash chain. As another example, signature rules 214 may apply a checksum or Cyclic Redundancy Code ("CRC") to calculate a digital signature. In yet another example, signature rules 214 may create a digital signature using a standard symmetrical encryption algorithm, for example, Advanced Encryption Standard ("AES"). Processor 220 may use digital signature rules 214 to determine whether the digital signature for ICS data 225 is identical to the digital signature for sync data 210. Calculating the digital signature for both ICS data 225 and sync data 210 increases security and redundancy of system 200. Once central site 206 determines that the two digital signatures are identical, jurisdiction 102 may communicate one or both of the digital signatures to regulator 106, external auditor 124, and/or any other suitable component of system 100.

As illustrated, jurisdiction 102 may also include computer 222. Computer 222 may represent any device that interacts with jurisdiction 102. Computer 222 could be one or more computers. Computer 222 could be located central site 206, one or more field terminals 202, and/or any other suitable location in system 200. In an embodiment, computer 222 may interact with central site 206, field terminals 202, or any other suitable component of system 200 via network 204 to request, modify, or receive data. For example, computer 222 may instruct central site 206 to apply digital signature rules 214 or any other suitable rule. In another example, computer 222 may create and/or update rules in memory 208. In yet another example, computer 222 may facilitate communicating a digital signature to components of system 100. In yet another embodiment, computer 222 may facilitate generating random numbers. Computer 222 may be used to facilitate exchanging digital signatures and/or seeds while remaining isolated as discussed in more detail in FIG. 3.

A component of jurisdiction 102 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

While FIG. 2 illustrates components of jurisdiction 102 operating within a gaming environment, jurisdiction 102 may operate in any environment to encrypt, secure, and audit data to prevent an entity's malicious tampering with the data during a committed blind exchange. Furthermore, while this disclosure describes field terminals 202 as separate from central site 206, field terminals 202 may be combined with central site 206. For example, central site 206 may be located within field terminals 202. As another example, memory 224 may be located remote to memory 208, field terminals 202, and/or central site 206.

Figure 3:
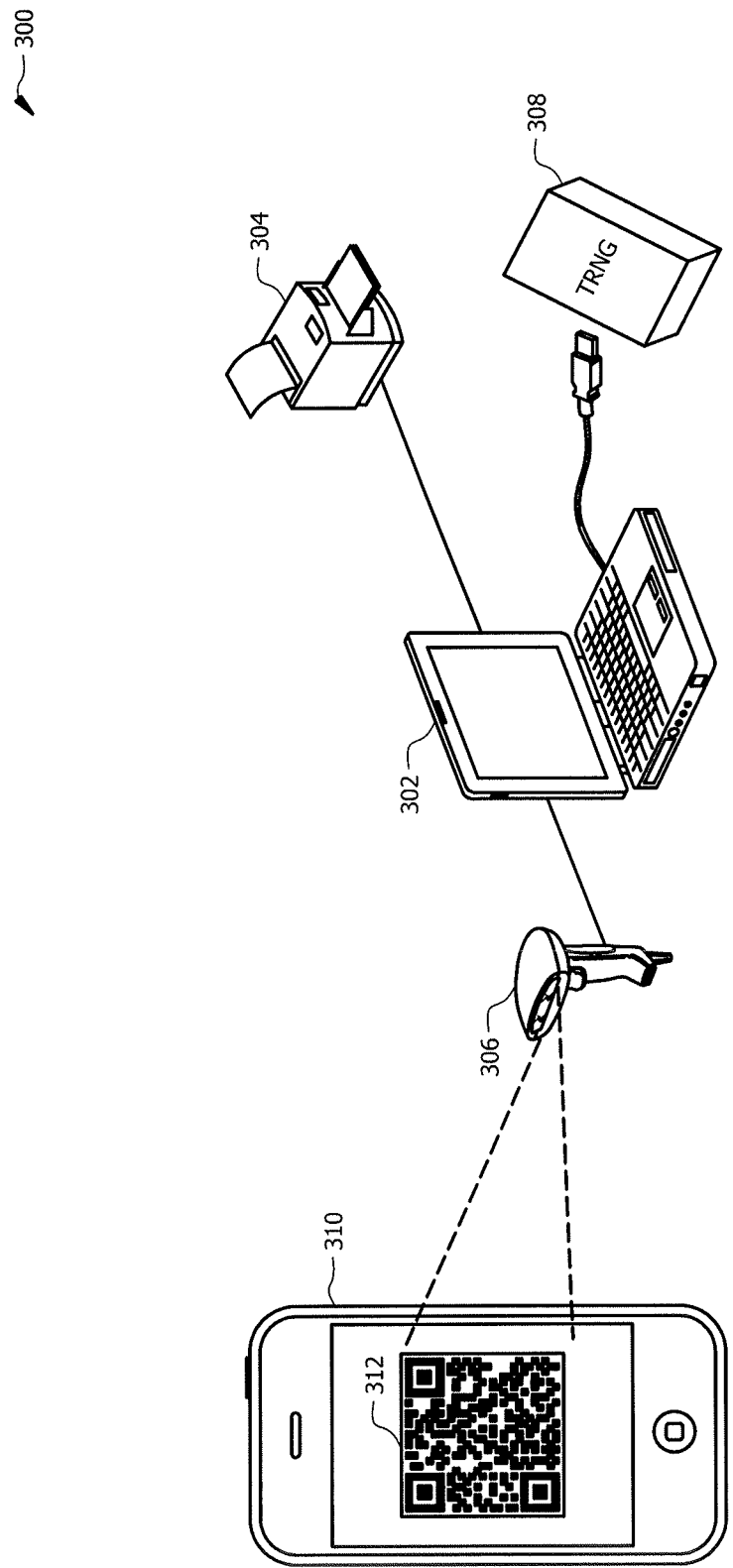
FIG. 3 further illustrates a computer used in a jurisdiction.

FIG. 3 further illustrates a computer used in a gaming environment. In an embodiment, system 300 represents computer 222. Additionally or alternatively, system 300 may represent computer 222. System 100 may comprise a plurality of system 300s. For example, each jurisdiction 102, regulator 106, and external auditor may comprise one or more system 300s. Generally, system 300 comprises computer 302, True Random Number Generator ("TRNG") 308, printer 304, cell phone 310, and barcode scanner 306. Computer 302 generally facilitates producing random numbers and communicating the random numbers to other jurisdictions 102, regulator 106, external auditor 124, printer 304, and/or phone 310. Computer 302 may facilitate transferring commit data to other jurisdictions 102, regulator 106, and/or external auditor 124, printer 304, and/or phone 310. Although illustrated as a laptop, computer 302 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 300, or any combination of the preceding. Computer 302 may also include a user interface, such as a display, a touchscreen, a microphone, keypad, or other appropriate terminal equipment usable by a user.

System 300 may comprise TRNG 308. In an embodiment, random number seeds are generated with a hardware TRNG 308. TRNG 308 may be any hardware that produces a random number and/or a true random number as known in the art. For example, TRNG 308 may comprise the IBM® 4758 Cryptographic Security Module and its successors, which derive random seeds from quantum noise across a tunnel diode; or the SCA® Gaming MiniRNG based on the Dallas Semiconductor® DS5250 chip, which derives random seeds from oscillator phase noise that is further "whitened" via an entropy improvement algorithm (Triple Data Encryption Standard, "3DES") per ANSI X9.31 Appendix A.2.4; or the Multi-State Lottery Association (MUSL) TRNG that derive random number seeds from measuring the time between atomic decay of a radioactive isotope; or the Simtec Entropy Key that utilizes P-N semiconductor junctions reverse biased with a high enough voltage to bring near breakdown in order to generate noise that become random number streams; or any other TRNG known in the art. Additionally or alternatively, TRNG 308 may rely on quantum events or infinitesimal shifts in Newtonian level events (e.g., temperature variations of a thousandth of a degree, number of milliseconds between human key actuation, etc.) to produce a random number. Generally, computer 302 (or any other suitable component) instructs TRNG 308 to generate a random number and TRNG 308 provides the random number to computer 302 or any suitable component of system 100, system 200, and/or system 300. While illustrated as separate from computer 302, TRNG 308 may be located within computer 302, separate from computer 302, or within any component of system 100, system 200, and/or system 300.

In the illustrated embodiment, system 300 comprises printer 304 and phone 310. In an embodiment, digital signature and seed data may be executed by human input via, for example, a computer keyboard. However, this embodiment may be error prone and complicated. In an embodiment, data may be committed and exchanged via printed or displayed barcodes 312 and barcode scanners 306. In this embodiment, commit and/or seed data from one jurisdiction 102, regulator 106, and/or external auditor 124 is embodied in one or more barcodes 312. The exact type of barcode 312 may vary, so long as it has the sufficient capacity to accommodate commit and seed data (e.g., 256 bits) and be decoded by the barcode scanner 306. Conversely, digital signature commit and seed data may be output from isolated system 300 via a generated barcode embodied on the computer screen or printed by the printer 304.

By exchanging commit and seed data via barcode, components of system 100, system 200, and/or system 300 may be protected against malicious software injection since the external data can only be input via barcode scanner 306 with standard data formatting (e.g., ASCII). Thus, both the separate TRNG 308 and its associated computer 302 may remain essentially isolated from outside influences. The method of embodying the barcode itself can vary (e.g., a physically printed barcode 312 or displayed on a computer screen or digital device 251) so long as no interface between the device embodying barcode 312, computer 302 and/or TRNG 308 is allowed other than its authenticated barcode scanner 306.

A component of system 300 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Although the components of system 300 are described as being remote, any component of system 300 may be within any other component of system 300. For example, TRNG 308 may be located within computer 302. Although described as a printer, printer 304 may be any device known in the art capable of physically affixing or displaying barcode 312 to any tangible medium. Further, as described as a phone, e.g., a smart phone, phone 310 may be any device capable of receiving and displaying barcode 312.

In one exemplary embodiment of operation, jurisdiction 102 and regulator 106 commit seed data to produce a draw result. Although described as taking place between one jurisdiction 102 and one regulator 106, this embodiment may be expanded to any number of jurisdictions 102, regulators 106, external auditors 124, or any combination of the preceding. Jurisdiction 102 generates a random number seed ($S_1$) and regulator 106 generates a random number seed ($S_2$). For example, jurisdiction 102 and regulator 102 may each generate a random number seed using TRNG 308 located within or remote to the jurisdiction 102 and regulator 106, respectively. In this exemplary embodiment, jurisdiction 102 and regulator 106 each use a separate TRNG 308 to produce the respective random number seeds.

Jurisdiction 102 and regulator 106 each commit to its respective seed by generating a digital signature of its seed and transmitting the digital signatures to each other. Jurisdiction 102 and/or regulator 106 may use, for example, digital signature rules 214 to create the digital signature. For example, the digital signature is a cryptographic hash of the random number seed $S_1$ or $S_2$, such as the Secure Hash Algorithm-256 (SHA-256); however, other forms of digital signatures are acceptable so long as the cleartext of the random number seeds $S_1$ or $S_2$ remains unknown to the other entity from the digital signature itself and that the digital signature can be used to confirm the cleartext random number seed $S_1$ or $S_2$ when it is eventually received.

After the digital signatures are exchanged, jurisdiction 102 and regulator 106 exchange their cleartext random number seeds $S_1$ and $S_2$. Once received by each other, the same algorithm that was used to generate the digital signature is applied to the received random number seed $S_1$ or $S_2$ to confirm that the previously received digital signature is identical to the calculated digital signature from the received cleartext random number seed $S_1$ or $S_2$. This ensures that jurisdiction 102 and regulator 106 generated a seed and communicated that seed before receiving the other entity's seed.

Assuming the calculated and received digital signatures match, the cleartext random number seeds $S_1$ and $S_2$ are combined to form a single seed, $S_e$. For example, $S_1$ and $S_2$ are encrypted with a one-time pad encryption algorithm. In this context, the one-time pad encryption algorithm may be a simple exclusive-OR operation. Other methods may be used to combine the seeds; the overall concept being to obfuscate each entity's random number seed $S_2$ or $S_2$ with the other entity's random number seed. Thus, since each entity was not cognizant of the other entity's random number seed $S_1$ or $S_2$, the resulting one-time pad ciphertext $S_e$ is completely unpredictable to either jurisdiction 102 or regulator 106 at the time the entity committed to the random number seed $S_1$ or $S_2$. In other words, since each entity must first select a random number seed $S_1$ or $S_2$ and commit to that number before the other entity's random number seed $S_1$ or $S_2$ is known, there is no way for an entity to nefariously impact the drawing's outcome. Either entity trying to force an outcome is essentially faced with the same problem as someone attempting to decrypt one-time pad ciphertext. Since the space of possible answers is all possible combinations, there is no way to manipulate the outcome.

The secure drawing is conducted using the one-time pad ciphertext $S_e$ with the resulting draw results exchanged between jurisdiction 102 and regulator 106. The actual drawing algorithm receives the one-time pad ciphertext $S_e$, and applies, for example, drawing rules 112/132 to perform a game unique (i.e., different algorithm compatible with the game type of the drawing) transformation to produce the appropriate draw game results (e.g., three decimal digits for a "Pick 3" drawing, four decimal digits for a "Pick 4" drawing, decimal digits "0-37" for a roulette game, 52 cards in a Poker deck shuffle) While the drawing algorithm design will vary, it is typically structured where the one-time pad ciphertext $S_e$ input is first applied to a LCG or Mersenne Twister that provides a deterministic series of number selections over some defined range. This resulting deterministic series of number selections output from the LCG or Mersenne Twister are then typically input to a Fisher-Yates type shuffle algorithm to transform the deterministic number selection series into the appropriate draw game results.

From this point, jurisdiction 102 and regulator 106 simply confirm that the drawing results received from each other are in agreement. Assuming the calculated results are in agreement, the drawing becomes official and the results are made public. Conversely, if the draw results disagree, the drawing is halted until both entities agree on a common draw result. For example, jurisdiction 102 and/or regulator 106 may conduct an audit by applying audit rules 116 to determine the why the draw results were not in agreement.

The above random number generation process is therefore secure against any one entity attempting to maliciously manipulate the drawing, the security being derived from the commitment of both entities to their random number seeds ($S_1$ or $S_2$) before gaining knowledge of the other entity's seed and then combining both seeds with one-time pad encryption with the resulting ciphertext ($S_e$) being the applied to drawing rules 114. Thus, no one entity can be cognizant of the final drawing outcome until both random number seeds ($S_1$ and $S_2$) are known with both entities executing the same protocol for final comparison before the drawing is publicly announced. Furthermore, since the protocol is initiated with two or more random seeds from separate TRNGs 308, the entire protocol and associated algorithms may be published for anyone to read with no compromise in security.

Although described as using random numbers to generate $S_1$ and $S_2$, this example embodiment may additionally or alternatively use real-world data to generate $S_1$ and $S_2$. For example, as described in more detail below, jurisdiction 102 and/or any other component of system 100 may track real-world data to produce seeds $S_1$ and $S_2$.

In another exemplary embodiment, one or more jurisdictions 102 may interact with regulator 106 and/or external auditor 124 to generate draw results. In this exemplary embodiment, the one or more jurisdictions 102 store real-world data as sync data 210 and/or ICS data 225 as described in relation to FIG. 2. At some predefined time period before a drawing is to occur (e.g., one hour) sales are suspended for the impending draw game. At this point, sync data 210 and ICS data 225 are frozen and audits are conducted to ensure that each jurisdiction's 102 sync data 210 is copacetic and in agreement with the jurisdiction's 102 respective ICS data 225. Whenever a jurisdiction 102 determines that sync data 210 and ICS data 225 are in agreement, the jurisdiction creates a digital signature of sync data 210 and/or ICS data 225 and forwards the digital signature to the regulator 106, along with a notification stating that the jurisdiction 102 is ready for the drawing.

When all jurisdictions 102 have transmitted correct audit notifications to regulator 106, the drawing is authorized and is conducted by regulator 106. In this exemplary embodiment, when all jurisdictions 102 report successful audits and transmit their calculated digital signatures for the pending draw game to regulator 106, the drawing authorization proceeds with the accumulation of digital signatures algorithmically combined, for example, using seed generation rules 112 to create a common drawing seed that is a function of the received digital signatures. A forensic audit trail of the drawing seed is automatically created and can be logged since the digital signatures from each jurisdiction 102 are a function of the wager activity of that jurisdiction 102 with the same sync data 210 being secure logged on multiple databases (e.g., memory 208 and memory 224) and locked down when betting is stopped for a pending draw at some predefined time interval (e.g., one hour) before the drawing. Thus, the randomness of the draw seeds are derived from the sum total of human betting behavior in regard to the pending draw game. This is possible because the drawing occurs over a predefined time period after the sync data 210 and/or ICS data 225 become static and hardened against modification after betting has been suspended for a given draw game.

In yet another exemplary embodiment, the security and integrity of system 100 may be further enhanced by including external auditor 124. External auditor 124 may also contribute to seed generation in addition to the multi jurisdiction digital signatures and regulator 106. In addition to added security and integrity, this embodiment has the additional advantage of providing real-time verification that a result is legitimate before it is released to the public.

In this exemplary embodiment, when all jurisdictions 102 report successful audits, the jurisdictions 102 transmit their respective calculated digital signatures to both regulator 106 and external auditor 124. Regulator 106 and external auditor 124 may then apply digital seed generation rules 112 and 130, respectively to generate a seed to input in a drawing algorithm. In this embodiment, seed generation rules 112 and 130 are identical and will produce the same drawing seed. Additionally or alternatively, this exemplary embodiment includes the added functionality of the external auditor 124 generating an RNG number (or any other suitable data, such as a digital signature) to use to facilitate generating the seed. For example, this data may be combined with the digital signatures provided by jurisdictions 102. Thus, both seed data 210 and seed data 128 comprise the digital signatures from jurisdictions 102 and the data from external auditor 124. Both regulator 106 and external auditor 124 apply identical seed generation rules 112/130, respectively to produce a resulting combined seed. Identical drawing rules 114/130 are applied to the resulting combined seed to produce drawing results.

Thus, two parallel processes with identical inputs maintained by different entities should both produce the same draw results. Audit rules 116 are applied to both of the draw results, and so long as the results are in agreement, the drawing is official and announced to the public. Alternatively, if the draw results disagree, the drawing is declared invalid and an immediate audit ensues to determine the cause with no official draw results reported to the public until the difference is resolved. Therefore, the addition of the external auditor 124 to the multi-jurisdiction draw game process has the added advantages of increased security and integrity as well as real-time verification of a draw game's authenticity.

Figure 4:
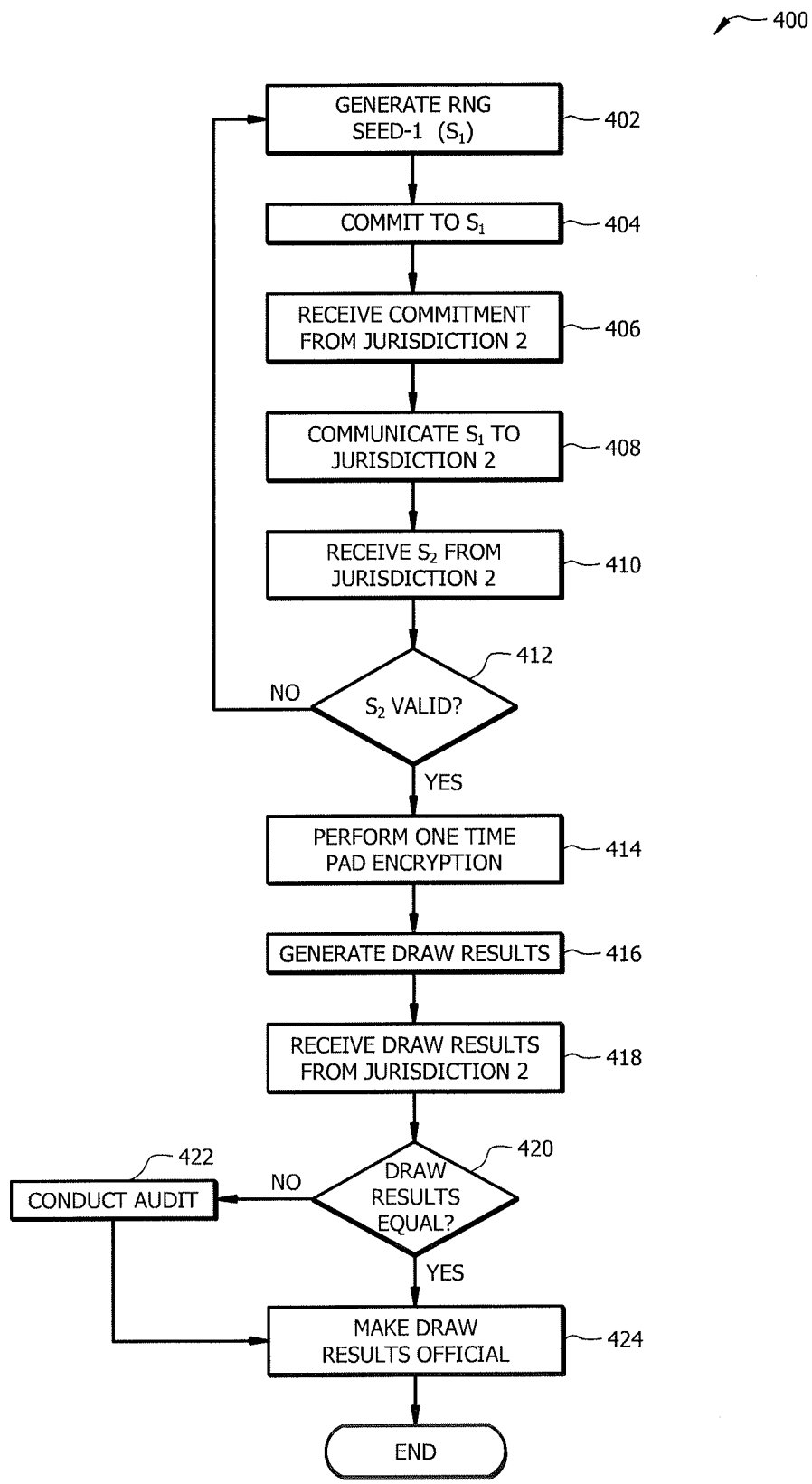
FIG. 4 illustrates an example method for generating draw results by combining at least two random numbers using a one-time pad; and, FIG. 5 illustrates an example method for generating draw results using digital signatures of real-world data.

FIG. 4 illustrates an example method for generating draw results by combining at least two random numbers via a one-time pad. This method is described as including first jurisdiction 102 and second jurisdiction 102. However, this method may be applied to any number of jurisdictions 102. Additionally, or alternatively, this method may be applied to any number of regulators 106 and/or external auditors 124. The method begins at step 402 where first jurisdiction 102 generates an RNG seed, $S_1$. For example, first jurisdiction 102 may generate $S_1$ using TRNG 308. At step 404, first jurisdiction 102 commits to $S_1$. For example, first jurisdiction 102 may commit to $S_1$ by generating a digital signature (e.g., a cryptographic hash) of $S_1$ and transmitting the digital signature to second jurisdiction 102.

In step 406, first jurisdiction 102A receives a commitment from second jurisdiction 102B. For example, second jurisdiction 102B may generate its own RNG seed, $S_2$. Second jurisdiction 102B may commit to $S_2$ by generating a digital signature and communicating the digital signature to first jurisdiction 102A.

Next, at steps 408 and 410, first jurisdiction 102A communicates $S_1$ to second jurisdiction 102B and second jurisdiction 102B communicates $S_2$ to first jurisdiction 102A. Each jurisdiction 102 may then confirm the validity of $S_1$ and $S_2$ respectively. For example, first jurisdiction 102A knows the digital signature algorithm of second jurisdiction 102B. Thus, for example, at step 412, first jurisdiction 102A may apply that same algorithm to $S_2$ to confirm that the previously received digital signature is identical to the calculated digital signature from the received cleartext of $S_2$. If first jurisdiction 102A cannot confirm $S_2$, the method proceeds to the beginning at step 402 where both jurisdictions 102 generate a new RNG seed. Alternatively, the method may end.

If, however, first jurisdiction 102A confirms $S_2$, the method proceeds to step 414 where first jurisdiction 102 applies a one-time pad encryption to $S_1$ and $S_2$ to generate a draw seed $S_e$. Next, in step 416, the draw seed $S_e$ is applied to a drawing algorithm to produce draw results.

Second jurisdiction 102B applies the same one-time pad encryption to $S_1$ and $S_2$ and uses the same drawing algorithm. Thus, the draw results of first jurisdiction 102A should be in agreement with the draw results of second jurisdiction 102B. At step 418, first jurisdiction 102A receives the draws results from second jurisdiction 102B. At step 420, first jurisdiction 102A compares the received draw results with its own generated draw results. If the draw results are in agreement, the draw results are made official and publicized in step 424 before the method ends.

If, however, the draw results are not in agreement in step 420, first jurisdiction 102A conducts an audit at step 422. For example, first jurisdiction 102A may contact second jurisdiction 102B to determine the reason for the discrepancy. During the audit, the two jurisdictions 102 may determine the reason for the discrepancy, fix the discrepancy, and then make the fixed draw result official in step 424. Alternatively, if the draw results are not equal in step 420, the method may either end or return to step 402 where the process is repeated.

Modifications, additions, or omissions may be made to the method depicted in FIG. 4. The method may include more, fewer, or other steps. For example, any number of jurisdictions 102 may participate in this method. As another example, any number of regulators 106 and external auditors 124 may participate in this method. As yet another example, first jurisdiction 102 and/or second jurisdiction 102 may generate $S_2$ and/or $S_2$ using real world-data as discussed previously instead of (or in addition to) using TRNG 308. As yet another example, steps may be performed in parallel or in any suitable order.

Figure 5:
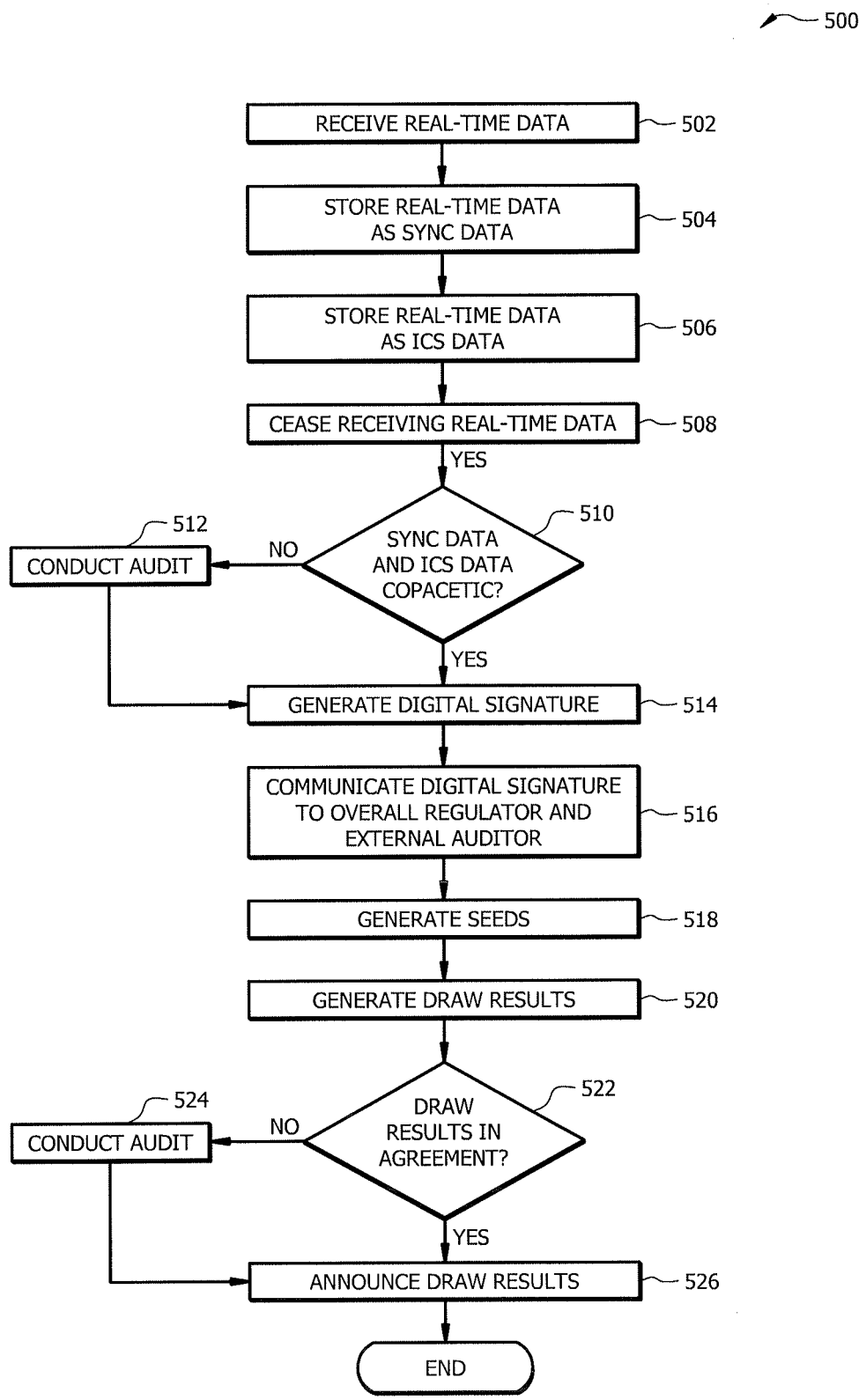

FIG. 5 illustrates an example method for generating draw results using digital signatures of real-world data. In this method, one or more jurisdictions 102 may communicate data to regulator 106 and/or external auditor 104. The communicated data may be used to generate a seed that facilitates generating a draw result. The method begins at step 502 where field terminal 202 receives real-word data. For example, field terminal 202 may receive one or more wagers from one or more customers. The method proceeds to step 504 where field terminal 202 stores the real-time data as sync data 210 in memory 208 and/or as ICS data 225 in a separate memory 224. As discussed, field terminal 202 and/or central site 206 may transform the real-world data before storing the data. For example, field terminal 202 may transform the data to include a serial number, a data, and field terminal number, etc.

At some time (e.g., one minute, one hour, one day, etc.) before the drawing, field terminal 202 may cease receiving real-time data at step 508. For example, field terminal 202 may stop accepting wagers from customers. Not accepting wagers before a seed is generated adds security to system 100 because a person or entity is unable to nefariously place a wager after a seed is known. Once field terminal 202 stops receiving real-time data in step 508, the method proceeds to step 510 where field terminal 202, or any other suitable component of system 100, determines whether sync data 210 is copacetic and in agreement with ICS data 225. As discussed, field terminal 202 stores identical information as sync data 210 and ICS data 225. Thus, unless the system is flawed, either maliciously or otherwise, sync data 210 and ICS data 225 will be identical. If sync data 210 and ICS data 225 are not in agreement, the method proceeds to step 512 where an audit is conducted to determine the reason for the discrepancy. If the reason for the discrepancy is determined, the problem is fixed and the method proceeds to 514. Otherwise, the method may end.

If sync data 210 and ICS data 225 are in agreement, the method proceeds to step 514 where field terminal 202, or any other suitable component of system 100, generates a digital signature of sync data 210 and/or ICS data 225. As discussed, field terminal 202 may generate a digital signal using a cryptographic hash. Field terminal 202 then communicates the digital signature to regulator 106 and external auditor 124 in step 516.

The method then proceeds to step 518 where regulator 106 and external auditor 124 each generate a seed. As discussed, regulator 106 and external auditor 124 may receive multiple digital signatures and/or other data from multiple jurisdictions 102, regulators 106, and/or external auditors 124. Regulator 106 and external auditor 126 may use all (or part of) this data to generate a seed by applying, for example, seed generation rules 112/130, respectively. The seeds are then input in a drawing algorithm (e.g., drawing rules 114/132) to generate a draw result at step 520.

At step 522, regulator 106 and external auditor 124 determine whether the draw results are in agreement. For example, regulator 106 and external auditor 124 receive identical data (e.g., seed data 110/128, respectively). Furthermore, regulator 106 and external auditor 124 apply identical seed generation rules 112/130 and drawing rules 114/132 to produce drawings results. Thus, regulator 106 and external auditor 124, outside of any malfunction (malicious or otherwise), will produce identical draw results. After regulator 106 and external auditor 124 confirm that the draw results are equal, the draw results are announced and publicized at step 526 before the method is ends.

However, if the draw results are not in agreement at step 526, and audit is conducted at step 524 to determine the reason for the discrepancy. Once the reason for the discrepancy is determined, the draw results are confirmed and the method again proceeds to step 526 where the results are announced. If the reason cannot be determined, the method may end. As shown, allowing regulator 106 and external auditor 124 determine draw results in parallel allows for real-time auditing and flagging of invalid draw results, in addition to added security of system 100.

Modifications, additions, or omissions may be made to the method depicted in FIG. 5. The method may include more, fewer, or other steps. For example, any number of jurisdictions 102, regulators 106, and/or external auditors 124 may participate in this method. As another example, first jurisdiction 102 and/or second jurisdiction 102 may, instead of (or in addition to) communicating digital signatures of real-world information, communicate a random number generated, for example, using TRNG 308. As yet another example, steps may be performed in parallel or in any suitable order.

Certain embodiments of the present disclosure may provide one or more technical advantages. A technical advantage of one embodiment includes increasing the security of data and encrypted data. As another example, a technical advantage of one embodiment includes increasing the security of gaming devices. As yet another example, a technical advantage includes increasing user's trust in the fairness of gaming devices. As a further example, a technical advantage of one embodiment includes improving the efficiency of publicizing draw results. As yet a further example, a technical advantage of one embodiment includes providing a forensic audit trail and determining malicious activity of draw results before the results are made public, which increases efficiency.

Other technical advantages of the present disclosure will be readily apparent to one skilled in the art from the following figures, descriptions, and claims. Moreover, while examples of specific advantages have been enumerated above, various embodiments may include all, some, or none of the enumerated advantages. It should be appreciated by those skilled in the art that various modifications and variations may be made present invention without departing from the scope and spirit of the invention.

What is claimed is:

1. A system, comprising:
   an interface operable to receive a first digital signature of real-world data;
   a memory operable to store the first digital signature as seed data;
   the interface further operable to receive a second digital signature of real-world data;
   the memory further operable to store the second digital signature as seed data;
   a processor operable to:
      generate first draw seed based, at least in part, on the seed data; and
      generate a first draw result based upon the first draw seed and a drawing algorithm;
   the interface further operable to receive a second draw result from a remote entity, the second draw result based, at least in part, on the first digital signature and the second digital signature;
   the processor further operable to determine whether the first draw result and the second draw result are in agreement; and
   upon a determination that the first draw result and the second draw result are in agreement, the interface further operable to communicate at least one of the first draw result and the second draw result.

2. The, system of claim 1, wherein the first digital signature of real-world data is received, using a barcode scanner, from a barcode.

3. The system of claim 1, wherein the draw result indicates the outcome of one of a lotto quick pick, slot machine, Keno, and national draw game.

4. The system of claim 1, wherein the real-world data is a compilation of wager information, the wager information indicating the time, amount, and location of a wager.

5. The system of claim 1, wherein the first digital signature and the second digital signature are generated at least in part, by one of a True Random Number Generator and using real-world data.

6. The system of claim 1, wherein the first draw seed is generated using a one-time pad encryption.

7. The system of claim 6, wherein the one-time pad encryption is an exclusive-OR combination.

8. A method, comprising:
   receiving, through an interface, a first digital signature of real-world data;
   storing, using a memory, the first digital signature as seed data;
   receiving, through the interface, a second digital signature of real-world data;
   storing, using the memory, the second digital signature as seed data;
   generating, using a processor, a first draw seed based, at least in part, on the seed data;
   generating, using the processor, a first draw result based upon the first draw seed and a drawing algorithm;
   receiving, through the interface, a second draw result from a remote entity, the second draw result based, at least in part, on the first digital signature and the second digital signature;
   determining, using the processor, whether the first draw result and the second draw result are in agreement; and
   upon a determination that the first draw result and the second draw result are in agreement, communicating, through the interface, at least one of the first draw result and the second draw result.

9. The method of claim 8, wherein the first digital signature of real-world data is received, using a barcode scanner, from a barcode.

10. The method of claim 8, wherein the draw result indicates the outcome of one of a lotto quick pick, slot machine, Keno, and national draw game.

11. The method of claim 8, wherein the real-world data is a compilation of wager information, the wager information indicating the time, amount, and location of a wager.

12. The method of claim 8, wherein the first digital signature and the second digital signature are generated at least in part, by one of a True Random Number Generator and using real-world data.

13. The method of claim 8, wherein the first draw seed is generated using a one-time pad encryption.

14. The method of claim 13, wherein the one-time pad encryption is an exclusive-OR combination.

15. Non-transitory computer readable medium comprising logic, the logic, when executed by a processor, operable to:
receive a first digital signature of real-world data;
store the first digital signature as seed data;
receive a second digital signature of real-world data;
store the second digital signature as seed data;
generate a first draw seed based, at least in part, on the seed data;
generate a first draw result based upon the first draw seed and a drawing algorithm;
receive a second draw result from a remote entity, the second draw result based, at least in part, on the first digital signature and the second digital signature;
determine whether the first draw result and the second draw result are in agreement; and
upon a determination that the first draw result and the second draw result are in agreement, communicate at least one of the first draw result and the second draw result.

16. The non-transitory computer readable medium of claim 15, wherein the first digital signature of real-world data is received, using a barcode scanner, from a barcode.

17. The non-transitory computer readable medium of claim 15, wherein the draw result indicates the outcome of one of a lotto quick pick, slot machine, Keno, and national draw game.

18. The non-transitory computer readable medium of claim 15, wherein the real-world data is a compilation of wager information, the wager information indicating the time, amount, and location of a wager.

19. The non-transitory computer readable medium of claim 15, wherein the first digital signature and the second digital signature are generated at least in part, by one of a True Random Number Generator and using real-world data.

20. The non-transitory computer readable medium of claim 15, wherein the first draw seed is generated using a one-time pad encryption.

* * * * *